Jan. 28, 1930.  E. E. GREVE  1,745,295
HOSE CONNECTION
Filed July 10, 1926
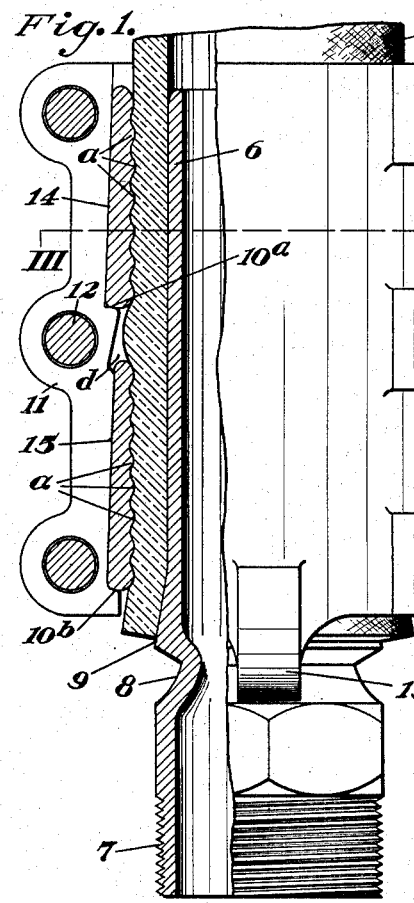
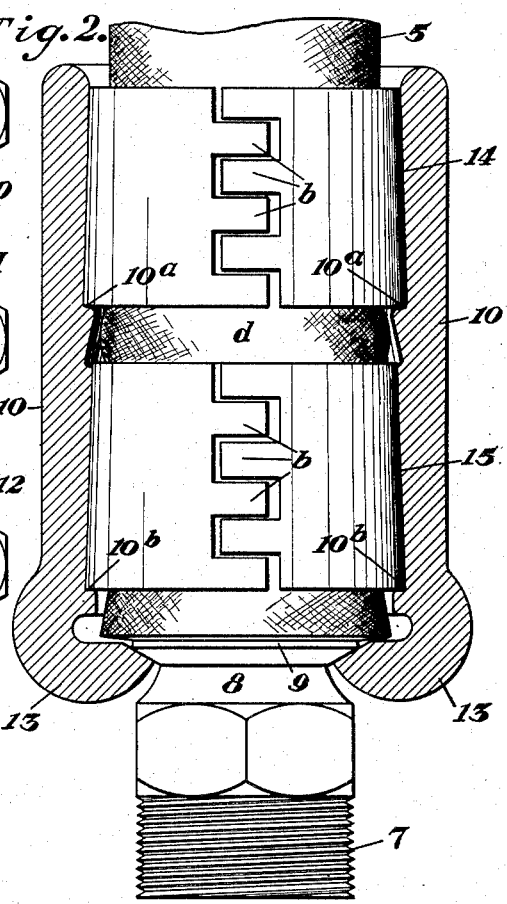
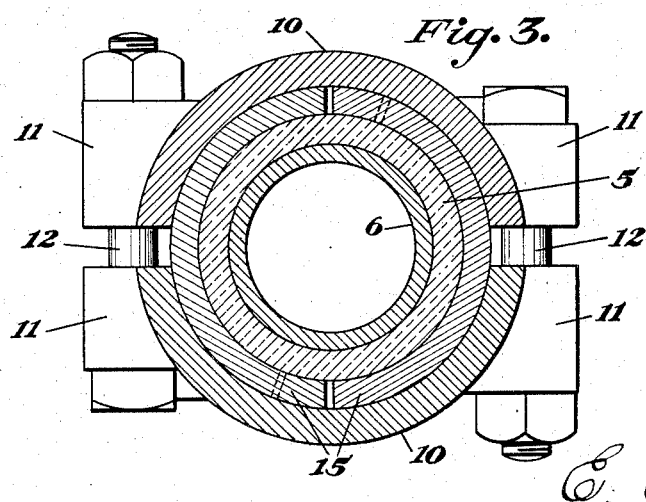
Inventor
E. E. Greve
By W. T. Doolittle
Attorney Patented Jan. 28, 1930

1,745,295

UNITED STATES PATENT OFFICE

EDGAR E. GREVE, OF BELLEVUE, PENNSYLVANIA

HOSE CONNECTION

Application filed July 10, 1926. Serial No. 121,542.

This invention relates to improvements in hose connections, and particularly to that type of hose connection or hose coupling and clamp shown in my United States Letters-Patent No. 1,300,956, of April 15, 1919. Hose connections of this class are especially adapted for use with hose employed in rotary drilling apparatus for drilling wells.

In use, the hose is subjected to considerable pressure, and the present invention is particularly directed to means for preventing the hose being stripped off the nozzle member of the connection.

In the accompanying drawing, which illustrates an application of my invention:

Fig. 1 is a part vertical sectional and a part elevational view of a hose connection embodying my invention;

Fig. 2, a view similar to Fig. 1, the section being taken at right angles to the section of Fig. 1; and Fig. 3, a part sectional and a part plan view, the section being taken on line III—III of Fig. 1.
Referring to the drawings, 5 designates a portion of the hose to which the nozzle and clamp construction or connection is applied. As illustrated and as preferred, the connection includes a nozzle member 6, adapted to be entered in the hose. Said member 6 is formed at one end with a threaded enlargement 7, an annular recess 8, and an annular tapered flange 9, the latter being adapted to make engagement with an end of the hose 5, as particularly shown in Fig. 1.

10 designates a divided clamp, preferably composed of two similar members, each having its interior face tapered. Each of the said members constituting the clamp is provided with an apertured enlargement or lug 11, through which bolts 12 are adapted to be passed, and is further provided with engaging lugs or hook members 13, the latter being designed to cooperate with the recessed portion 8 of the nozzle member when the parts are assembled.

Disposed within the divided clamp 10 and between the nozzle and the inner surface of the said clamp, are two independent sets of slip or wedge members 14 and 15. These members are slightly tapered on the exterior thereof, the tapers extending in an opposite direction from the taper of the clamp members they are designed to engage. The slip members are each provided with a serrated or corrugated hose gripping face $a$ and with an interlocking member $b$.

It will be noted that the two sets of slips or wedges are disposed in different horizontal planes, or separated so as to provide a space $d$ between the adjacent ends thereof. The purpose of arranging the slip members 14 and 15 in this spaced relationship is to permit the hose to be bulged between the ends of the slips, thereby providing additional means for preventing the hose from being stripped or pulled off the nozzle.

Attention is called to the fact that the end of the hose projects beyond the ends of the lower set of slips 15, and that the hose is held between the slip and the tapered flange 9 of the nozzle. This construction provides a still further hose gripping and retaining means.

In hose connections of this type it is important that the hose and its engaging slips have a slip movement relatively to the body of the clamp, and I have made provision for this by forming that portion of the nozzle located within the clamp with a smooth hose contacting surface.

The interior of the clamp 10 is formed with annular ledges $10^a$ and $10^b$ upon which the ends of the slips 14 and 15 respectively rest.

The construction herein shown and described may be readily assembled and disassembled, the divided clamp member being quickly connected together and with the desired tightness by means of the several bolts 12.

It will be understood that, when the clamp is applied to that portion of the hose disposed on the nozzle, with the slips 14 and 15 in position and spaced apart to provide the annular space $d$, the clamp members may be moved into operative gripping position by means of bolts 12. By the provision of the space $d$, a portion of the hose will be bulged outwardly into this space, due to the pressure of the clamping members on the hose.

What I claim is:

1. In a hose connection, the combination with a nozzle member, of a divided encircling clamp member spaced from the nozzle member, separated slip members located in the space between the nozzle and the clamp and having their adjacent ends disposed to provide a relatively small space therebetween, said slips engaging the hose within the connection to bulge the hose outwardly into the said last mentioned space between the separated slip members whereby the ends of the slip members clamp the bulged portion of the hose therebetween, and means for securing the clamping members together.

2. In a hose connection, the combination with a nozzle member, of a two-part divided encircling clamp member spaced from the nozzle member, and having interior slip supporting shoulders, two sets of independent slip members located in slightly spaced apart relationship in the space between the nozzle and the clamp and positioned on the shoulders, said slips engaging the hose within the connection to bulge the hose outwardly between the adjacent ends of the two sets of slips, whereby the bulged portion is clamped between the said adjacent ends, and means for securing the clamping members together.

3. In a hose connection, the combination with a nozzle member, of a divided encircling clamp member spaced from the nozzle member, two sets of independent slip members located in the space between the nozzle and the clamp and having their adjacent ends disposed to provide a small space therebetween, a portion of a hose entered in the first mentioned space, said slips engaging the hose in the connection to bulge the hose outwardly into the said space between the adjacent ends of the slip whereby the bulged portion is clamped between the said adjacent ends, a tapered flange on the nozzle, said hose extending beyond an end of a slip and held between said end and said flange whereby an additional clamping of the hose in the connection is obtained, and means for securing the clamping members together.

In testimony whereof I affix my signature.

EDGAR E. GREVE.